(12) United States Patent
Del Vecchio

(10) Patent No.: US 7,931,323 B1
(45) Date of Patent: Apr. 26, 2011

(54) FAIL-SAFE TRAVEL BAR LOCK FOR RV SLIDE-OUT ROOM

(75) Inventor: Thomas L. Del Vecchio, Middlebury, IN (US)

(73) Assignee: Dicor Corporation, Elkhart, IN (US)

( * ) Notice: Subject to any disclaimer, the term of this patent is extended or adjusted under 35 U.S.C. 154(b) by 234 days.

(21) Appl. No.: 12/333,827

(22) Filed: Dec. 12, 2008

(51) Int. Cl.
*B60P 3/34* (2006.01)

(52) U.S. Cl. .................. 296/26.01; 296/165; 296/171; 296/26.12; 296/26.13

(58) Field of Classification Search .............. 296/156, 296/165, 171, 175, 176, 26.01, 26.08–26.15; 52/67
See application file for complete search history.

(56) References Cited

U.S. PATENT DOCUMENTS

| | | | | |
|---|---|---|---|---|
| 5,570,924 A * | 11/1996 | Few et al. | ..................... | 296/175 |
| 5,860,686 A * | 1/1999 | Tiedge | ....................... | 296/26.14 |
| 6,428,073 B1 * | 8/2002 | Blodgett, Jr. | ............... | 296/26.14 |
| 6,655,723 B2 * | 12/2003 | Meijer et al. | ............... | 296/26.01 |
| 6,932,403 B2 * | 8/2005 | Meijer et al. | ............... | 296/26.01 |
| 7,234,758 B2 * | 6/2007 | Peter | ............................. | 296/165 |
| 7,237,818 B2 * | 7/2007 | Crean et al. | ................. | 296/26.13 |
| 7,378,927 B2 * | 5/2008 | DiSalvo et al. | ................. | 335/18 |
| 7,637,358 B1 * | 12/2009 | Revelino et al. | ............. | 188/157 |
| 2007/0194585 A1 * | 8/2007 | Roberts et al. | ............. | 296/26.01 |

* cited by examiner

*Primary Examiner* — Glenn Dayoan
*Assistant Examiner* — Gregory Blankenship
(74) *Attorney, Agent, or Firm* — Botkin & Hall, LLP

(57) ABSTRACT

An electromechanical travel bar lock assembly disables the flow of power to the power drive that moves a RV slide-out room between the traveling position and the deployed position. The assembly includes a bar for removably securing between the wall of the vehicle and the facer board of the slide-out room to prevent the room from moving. The travel bar is provided with an actuator that actuates, directly or indirectly, a switch means incorporated into the circuitry of the power drive so that power is not permitted to flow from its source to the drive, and the slide-out room cannot be moved when the travel bar is positioned between the vehicle wall and the facer board. The actuator, switch, and circuitry may embody any one of several different configurations and/or combinations.

18 Claims, 10 Drawing Sheets

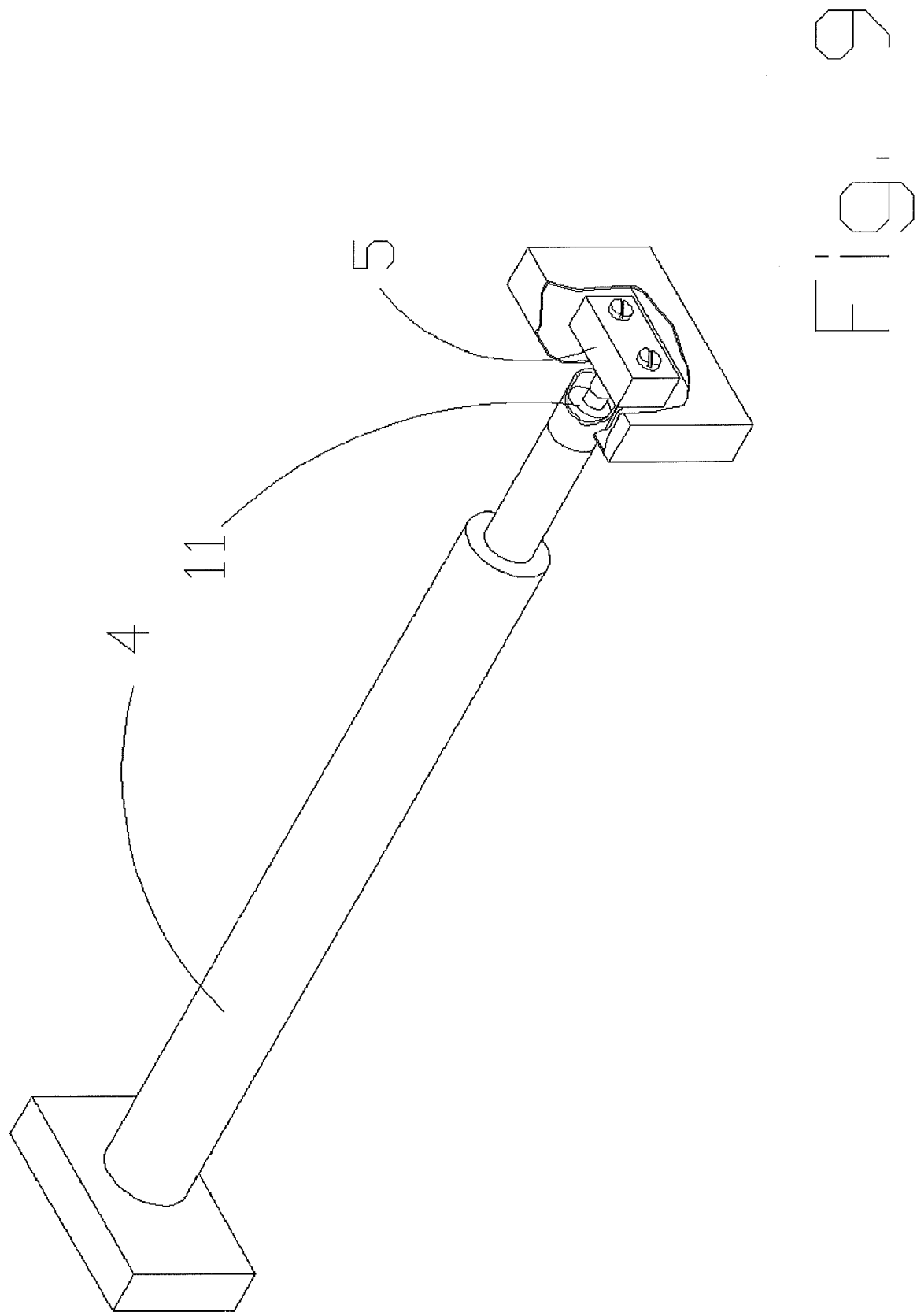

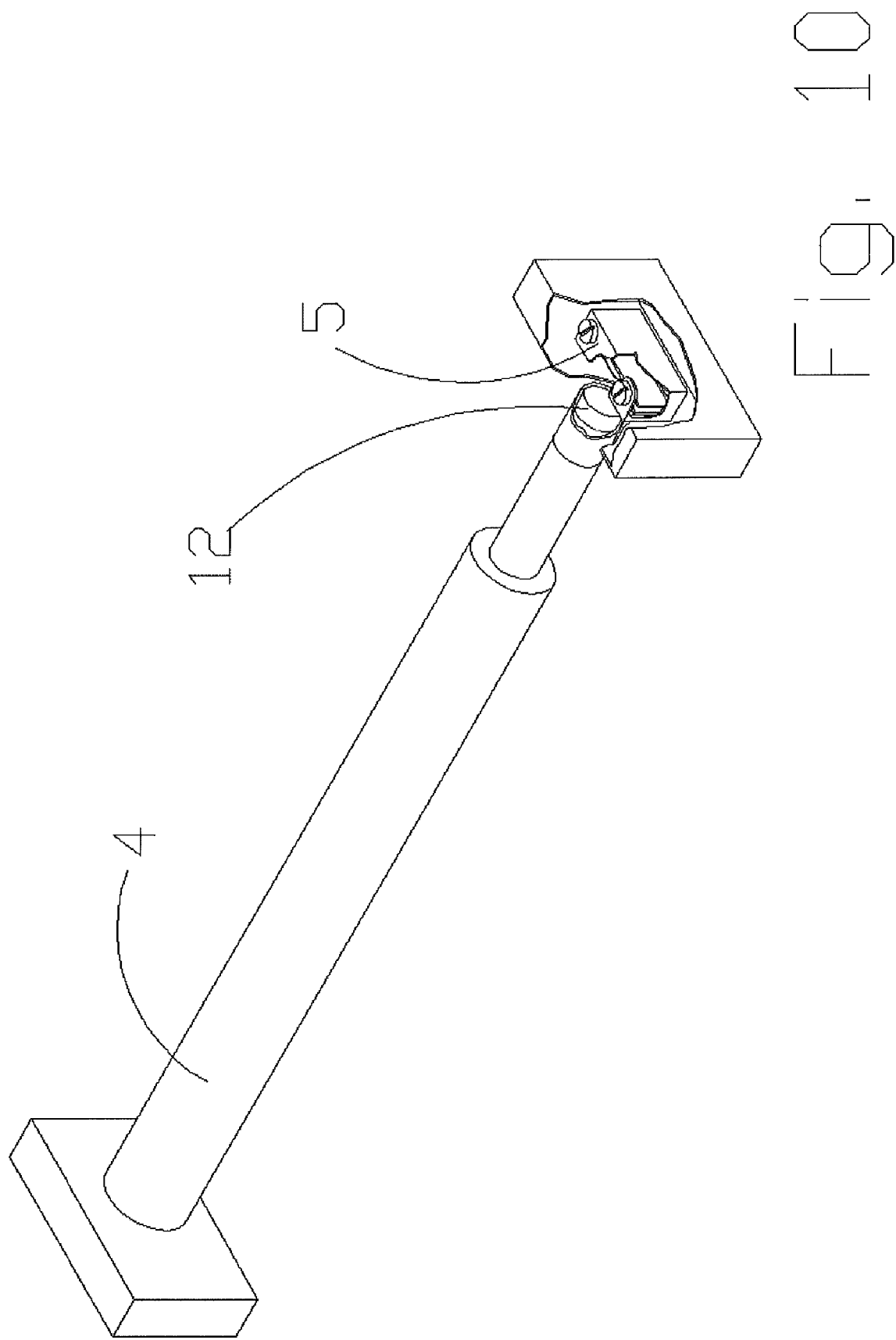

FAIL-SAFE TRAVEL BAR LOCK FOR RV SLIDE-OUT ROOM

BACKGROUND OF THE INVENTION

1. Field of the Invention

The invention relates to a slide-out room accessory device known as a travel bar or travel lock and, more particularly, to a fail-safe travel bar lock for a recreational vehicle slide-out room.

2. Description of the Background of the Invention

Typically, slide-out rooms on recreational vehicles are retracted into the interior of the vehicle during travel. Securing the slide-out room to the vehicle body at the top edge is troublesome due to the space that exists between the two wall elements and weather seals. This space creates a potential for water and or insects to enter the interior living space of the RV. Elongate rigid members referred to as travel bars, therefore, are typically used to help improve the mating of the two wall surfaces. The travel bar is installed between the facer board of the slide-out room and the wall of the vehicle accordingly. In addition to improving the match up of the walls, travel bars enhance the structural integrity between the slide-out room and the vehicle structure, which also provides additional occupant safety during travel.

Travel bars of various designs are available in the marketplace. Most all designs, however, require that the bar be removed from the installed position before engaging the power drive system to move the slide-out room from the interior of the vehicle to its deployed camping position. Failure to remove the travel bar will severely damage the vehicle due to the significant forces transmitted through these ridged elements.

To prevent damage to the room and vehicle wall, before this invention, it has been the operator's duty to determine whether the travel bars have been removed before engaging the power drive system. Visual warning methods, therefore, have been developed in an attempt to make the operator aware that travel bars are installed. These visual warnings have taken the form of labels, stickers, and ribbons conspicuously adhered to or depending from the slide-out room explaining the hazard and warning of the presence of the travel bars. Such warning indicia, though, can become illegible over time or fall away and be thrown out; and irrespective of such visual cues, the operator may forget to remove the bars before engaging the power drive to deploy the room. Costly property damage often occurs despite the warnings.

Another method used to minimize damage due to the inadvertent operation of the power drive system is to incorporate shearing pins into the travel bar design that allow the collapse and failure of the travel bar before it damages the RV. This method, however, requires the replacement of the shear pins in order that the bar can once again serve its intended purpose.

This invention prevents operation of the slide-out room's power drive system when the travel bars are in the installed position.

SUMMARY OF THE INVENTION

This invention provides for the installation and removal of the travel bar without the use of tools and electrically disables the power drive system of the slide-out room. Disabling the drive eliminates the possibility of the operator activating the power drive system with the travel bar installed, which in turn, will eliminate the damage to walls of the vehicle and slide-out. Additionally, the more costly specially designed travel bar incorporating shear pins will no longer be required because the potential for the shearing force is eliminated. The warning labels, tapes, and ribbons now used, which offer no guarantee of success, will no longer be required thus improving the overall aesthetic appearance of the RV's interior.

In the broader aspects, the invention provides a travel bar lock assembly for a slide-out room of a recreational vehicle. The slide-out room has a power drive for moving the room between a traveling position in which the room is located essentially inside the vehicle and a deployed position wherein the room extends outward from the vehicle. The lock assembly includes a travel bar for removably securing between a wall of the vehicle and a facer board of the slide-out room, a power source for powering the drive, circuitry electrically connecting the power source and the drive, and a switch means for controlling the flow of power to the drive. The travel bar includes an actuator portion, and the actuator portion actuates the switch means so that the switch means disables the flow of power to the power drive when the travel bar is secured between the vehicle wall and the facer board of the slide-out room, and the actuator portion allows the flow of power to the power drive when the travel bar is removed from between the vehicle wall and the facer board.

In one aspect of the invention, the switch means may include a plug and socket assembly. The actuator portion of the bar includes a cord with a plug. The socket is electrically connected to the circuitry so that the circuitry is closed, the drive has no power, and the slide-out room cannot be moved when the socket receives the plug and the travel bar is secured between the vehicle wall and the facer board of the slide-out room. The circuitry may include a relay electrically connected to the power drive for controlling the flow of power to the power drive.

In another aspect, the switch means may include an interlock switch having magnetic reeds. The actuator portion of the travel bar may include a magnet for closing the reeds on the interlock switch and closing the circuitry so the drive has no power and the slide-out room cannot be moved when the travel bar is secured between the vehicle wall and the facer board of the slide-out room.

In another aspect, the circuitry may include a relay and a power drive switch electrically connected between the interlock switch and the power drive. The power drive switch may be a single pole double throw normally open switch, or a double pole double throw normally open switch where polarity reversal is used to determine the direction of movement of the slide-out room.

In still another aspect, the switch means may include an interlock switch with a button, and the actuator portion of the travel bar may be adapted to engage the button on the interlock switch and close the circuitry so the drive has no power and the slide-out room cannot be moved when the travel bar is secured between the vehicle wall and the facer board of the slide-out room.

In yet another aspect, a method is provided for powering off the drive of a slide-out room that moves the room between a traveling position in which the room is located essentially inside a vehicle and a deployed position wherein the room extends outward from the vehicle. The slide-out room includes a locking apparatus with at least one travel bar for removably securing between a wall of the vehicle and a facer board of the slide-out room when the room is in the traveling position. The method includes (i) electrically connecting a switch means downstream from a power source that powers the drive and upstream from the drive and (ii) providing an actuator portion on the travel bar, wherein the actuator portion actuates the switch means so that the switch means turns off the flow of power to the power drive when the travel bar is secured between the vehicle wall and the facer board of the slide-out room, and allows the flow of power to the power drive when the travel bar is removed from between the vehicle wall and the facer board of the slide-out room.

One object of the invention is to provide a fail-safe travel bar lock for a RV slide-out room. Related objects and advantages of the present invention will be apparent from the following description.

BRIEF DESCRIPTION OF THE DRAWINGS

FIG. 9 is a perspective view of an embodiment of the travel bar of the invention showing the actuator portion engaging the button of the switch; and FIG. 10 is a perspective view of an embodiment of the travel bar of the invention showing the magnet.

DETAILED DESCRIPTION OF INVENTION

Figure 1:
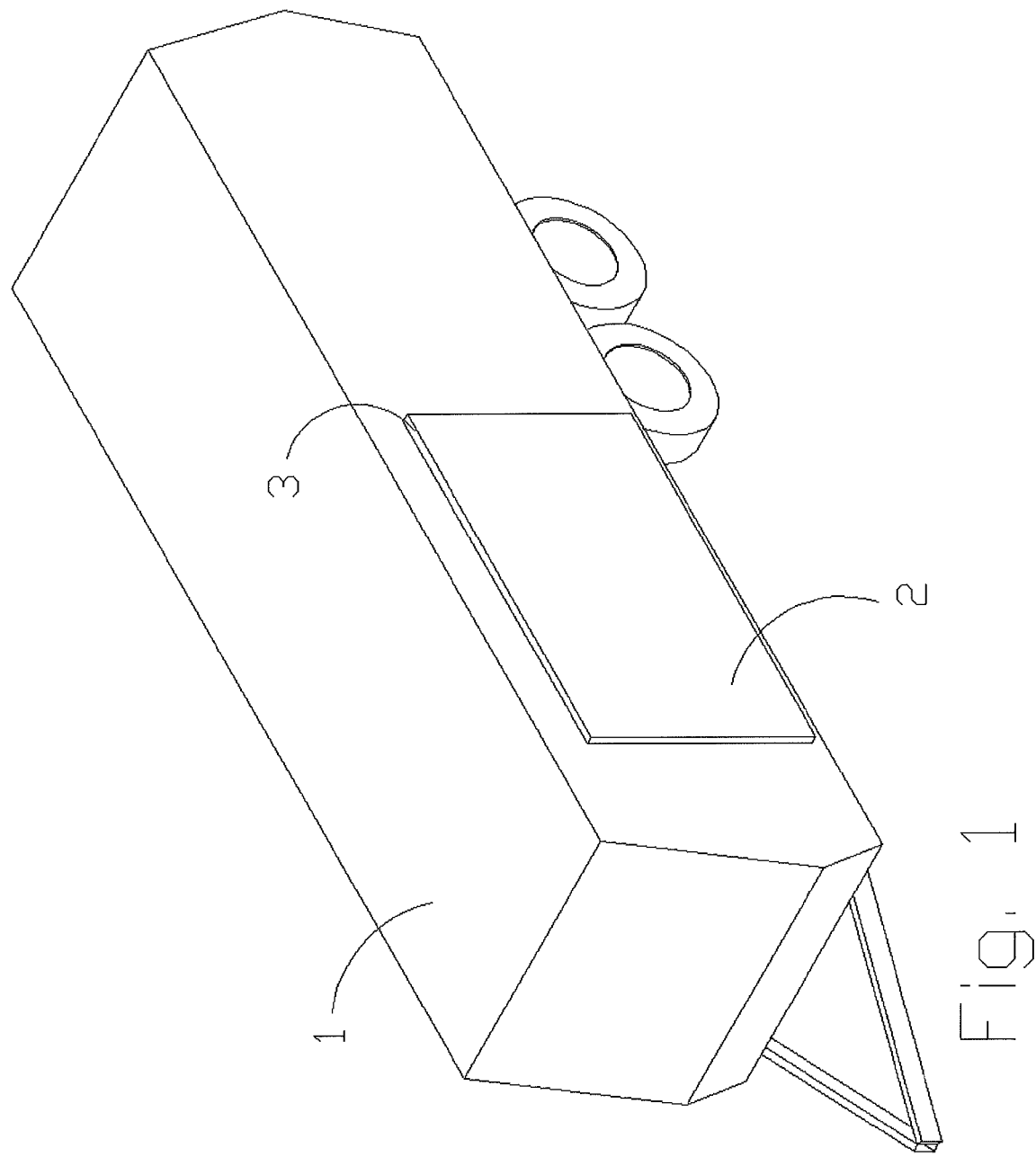
FIG. 1 is an elevated perspective view showing a typical recreational vehicle with a slide-out room in the traveling position.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Referring to the drawings, a recreational vehicle 1 is illustrated as it might typically appear when viewed from the exterior with the slide-out room 2 in the stored or traveling position. Top edge 3 is the area that is visually and mechanically unacceptable if the side wall of the slide-out room 2 is not held secure to the side wall of the recreational vehicle 1.

Figure 2:
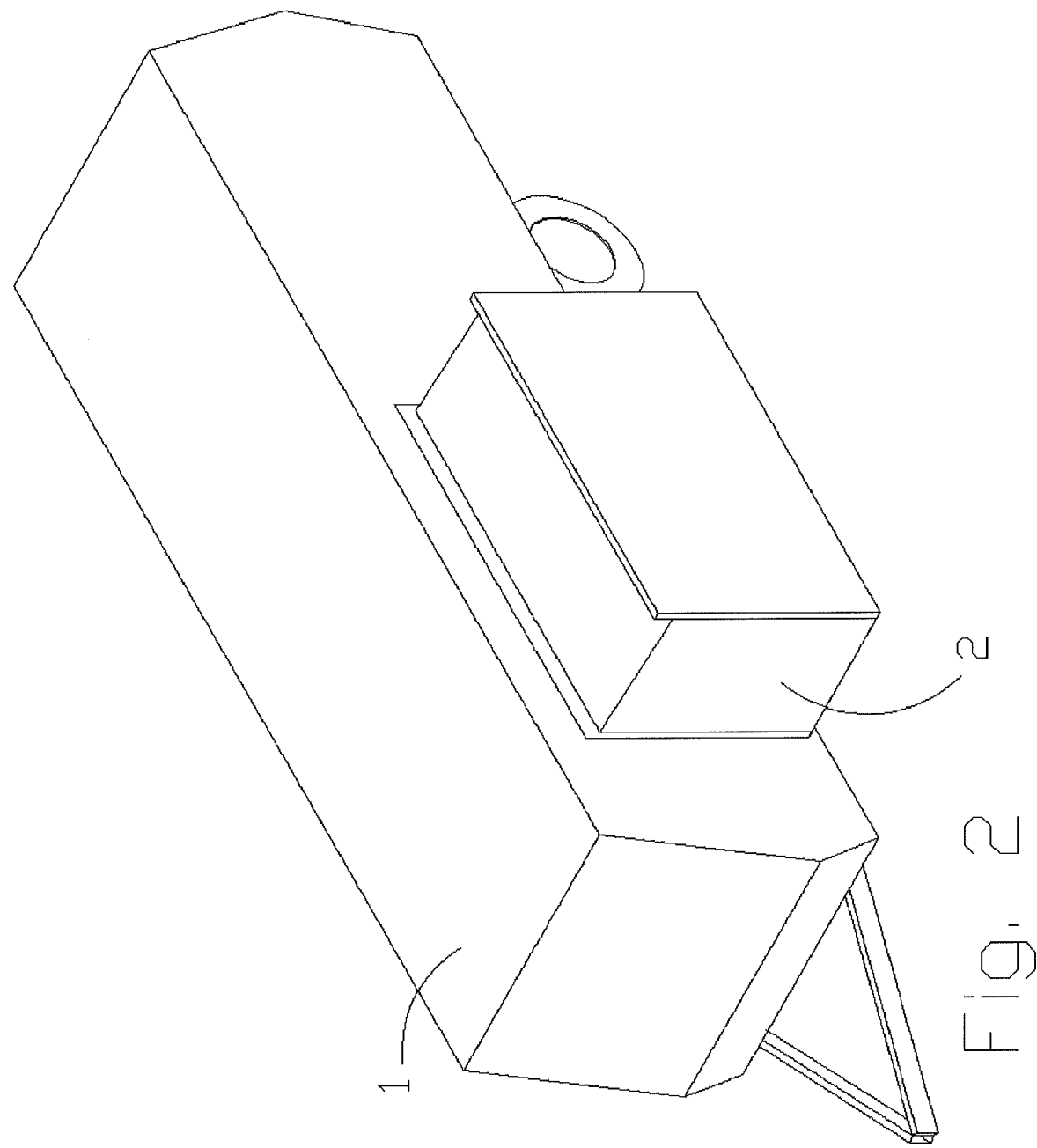
FIG. 2 is a view similar to the view of FIG. 1 showing the slide-out room in the deployed position.

The invention, therefore, relates to an electromechanical travel bar lock assembly that disables the flow of power to the power drive that moves a recreational vehicle slide-out room 2 between the traveling position (FIG. 1) and the deployed position, as shown in FIG. 2. The assembly includes a bar 4 for removably securing between the wall of the vehicle 1 and the facer board 6 of the slide-out room to prevent the room from moving. The travel bar is provided with an actuator 11, 12, 15 that actuates, directly or indirectly, a switch means incorporated into the circuitry of the power drive so that power is not permitted to flow from its source to the drive, and the slide-out room 2 cannot be moved when the travel bar 4 is positioned between the vehicle wall and the facer board, as shown in FIG. 4.

FIG. 2 shows the recreational vehicle 1 as viewed from the exterior with the slide-out room 2 in the deployed position.

Figure 3:
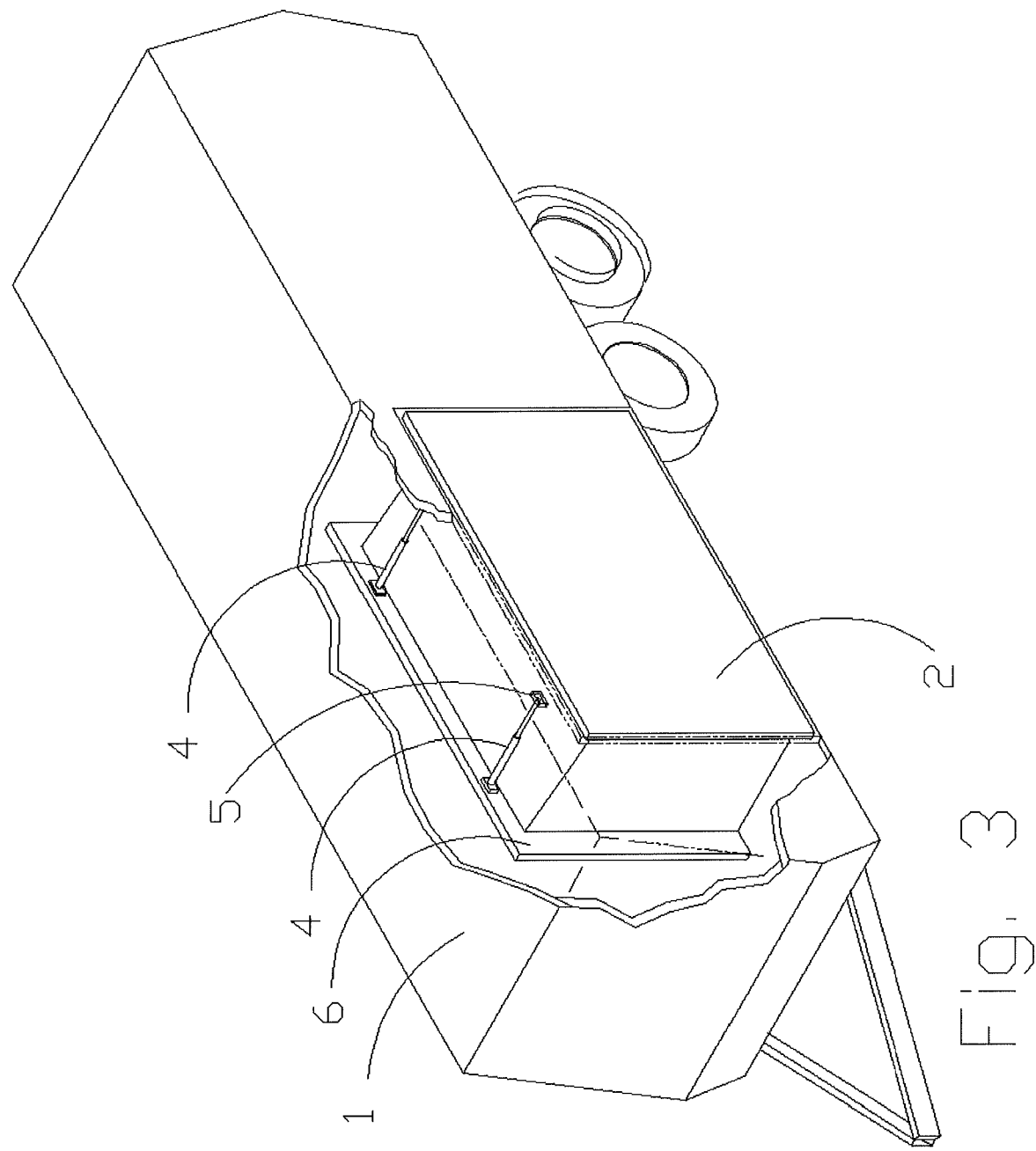
FIG. 3 is a partial cutaway view of a recreational vehicle with a slide-out room in the traveling position showing an embodiment of the traveling bars of the invention secured between a wall of the vehicle and the facer board of the slide-out room.

FIG. 3 is a cutaway view of the recreational vehicle 1 from the exterior. The slide-out room 2 is shown in the traveling position. The travel bar 4 is located within the recreational vehicle 1 where one end of the travel bar 4 is connected to an electrical interlock switch 5 with the opposite end of the travel bar 4 securely placed against the rear side of the slide-out room facer board 6. In this embodiment the power to the drive system is interrupted.

Figure 4:
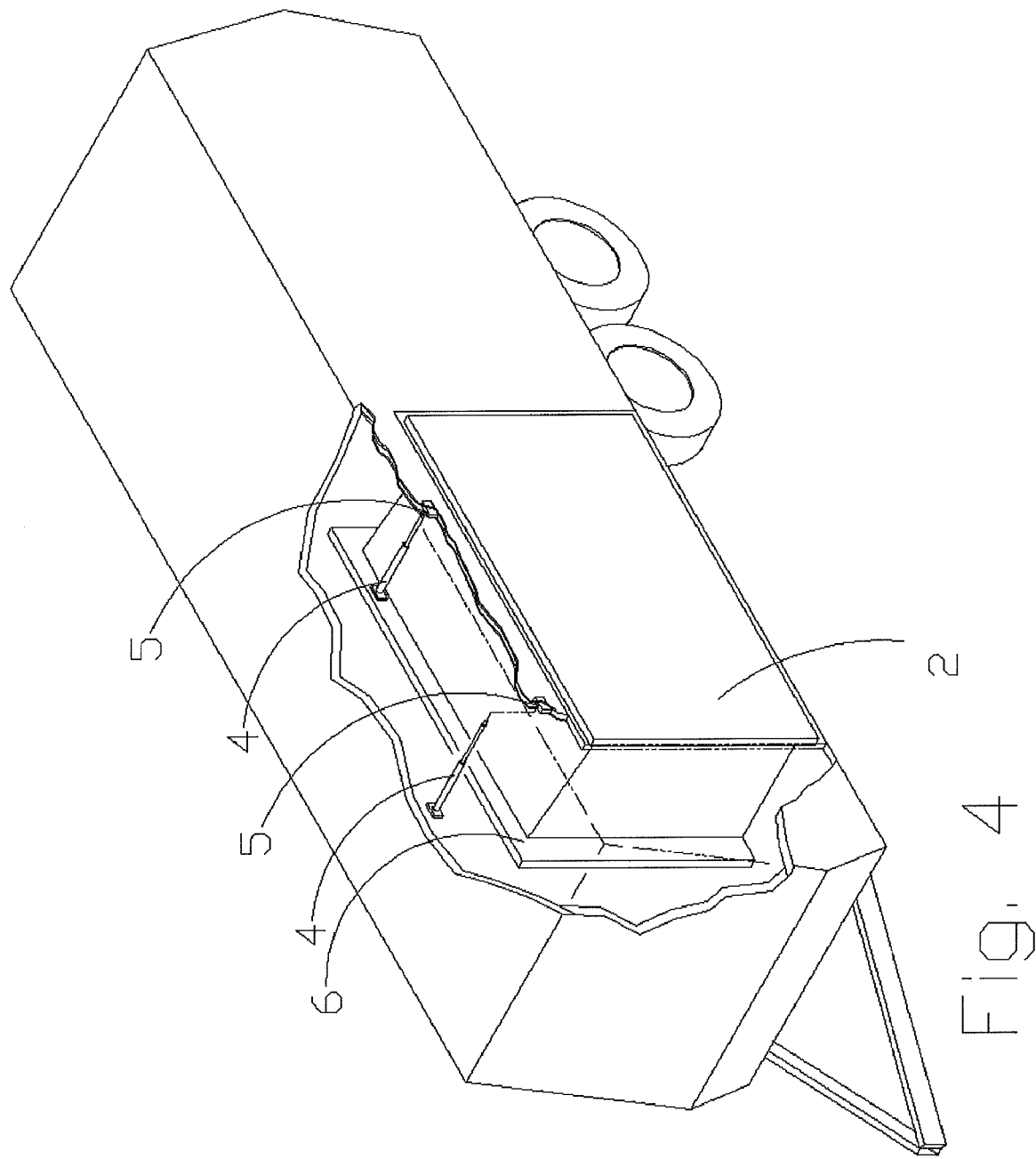
FIG. 4 is a view of an embodiment similar to the one of FIG. 3 showing a travel bar removed to illustrate the location of the switch.

FIG. 4 demonstrates the removal of the travel bar 4 from the electrical interlock switch 5 and the slide-out room facer board 6 allowing the slide out room 2 to be moved from the traveling position to the deployed position by the power drive system of the vehicle.

The switch means may include a plug and socket assembly or an interlock switch with magnetic reeds, a push button, or other known switches. At least one relay is preferably included in the examples of circuit diagrams shown and described. Those skilled in the art will understand that the actuator, switch, and circuitry may embody any one of several different configurations and/or combinations and that the circuit diagrams shown and discussed below should not be construed as limiting.

Figure 5:
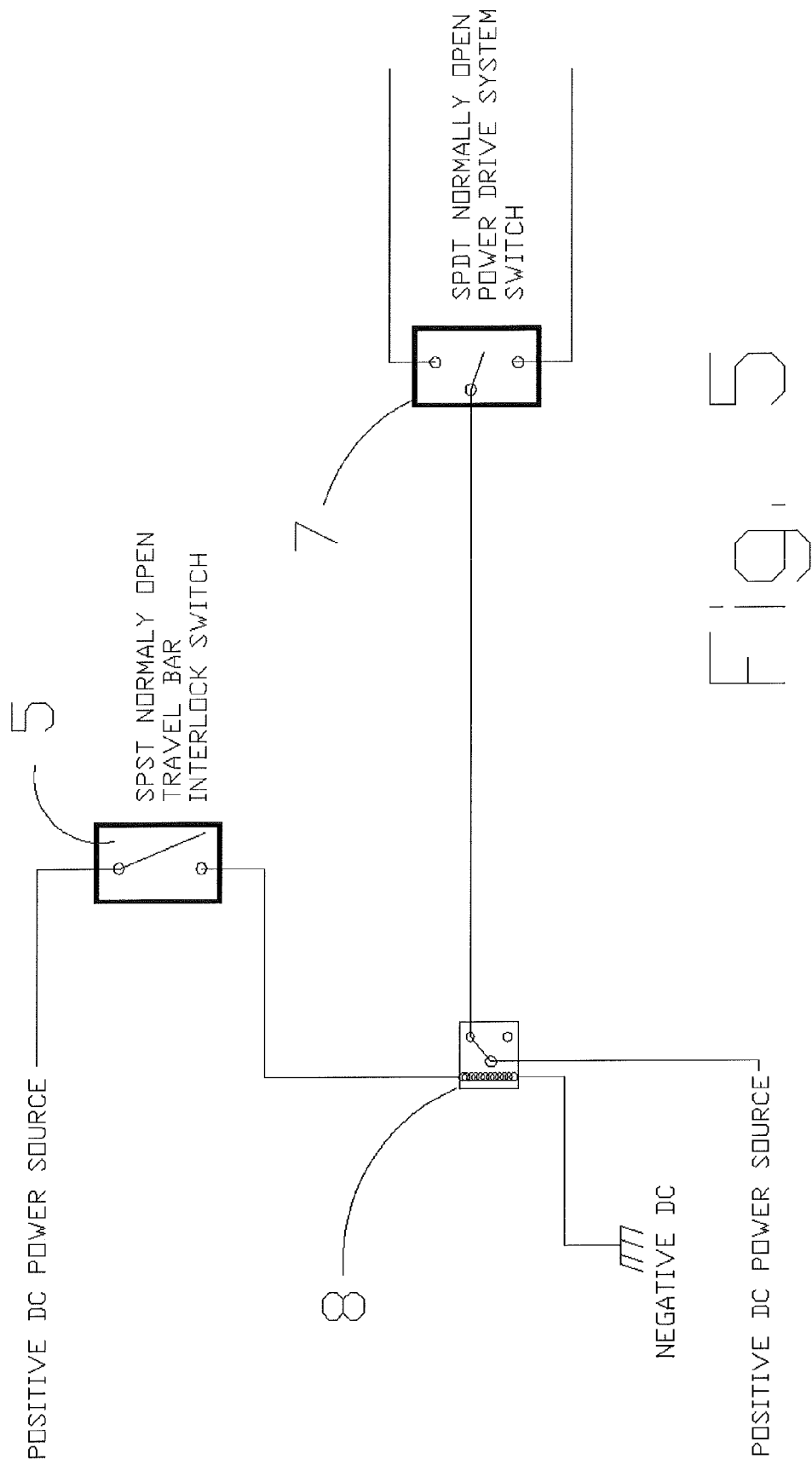
FIG. 5 is an electrical schematic for a typical slide-out room power drive system that uses a single pole double throw power drive normally open switch.

FIG. 5 is a schematic of a typical power drive electrical control circuit utilizing a single pole double throw normally open switch 7 where polarity reversal is not used to determine the direction of movement of the slide-out room. The operator controls the inward and outward movement of the slide-out room with this switch. The electrical interlock switch 5 is closed when the travel bar is installed. Electrical power is then sent to the control relay 8 to disconnect power to the single pole double throw normally open switch 7 preventing movement of the slide-out room by the operator.

Figure 6:
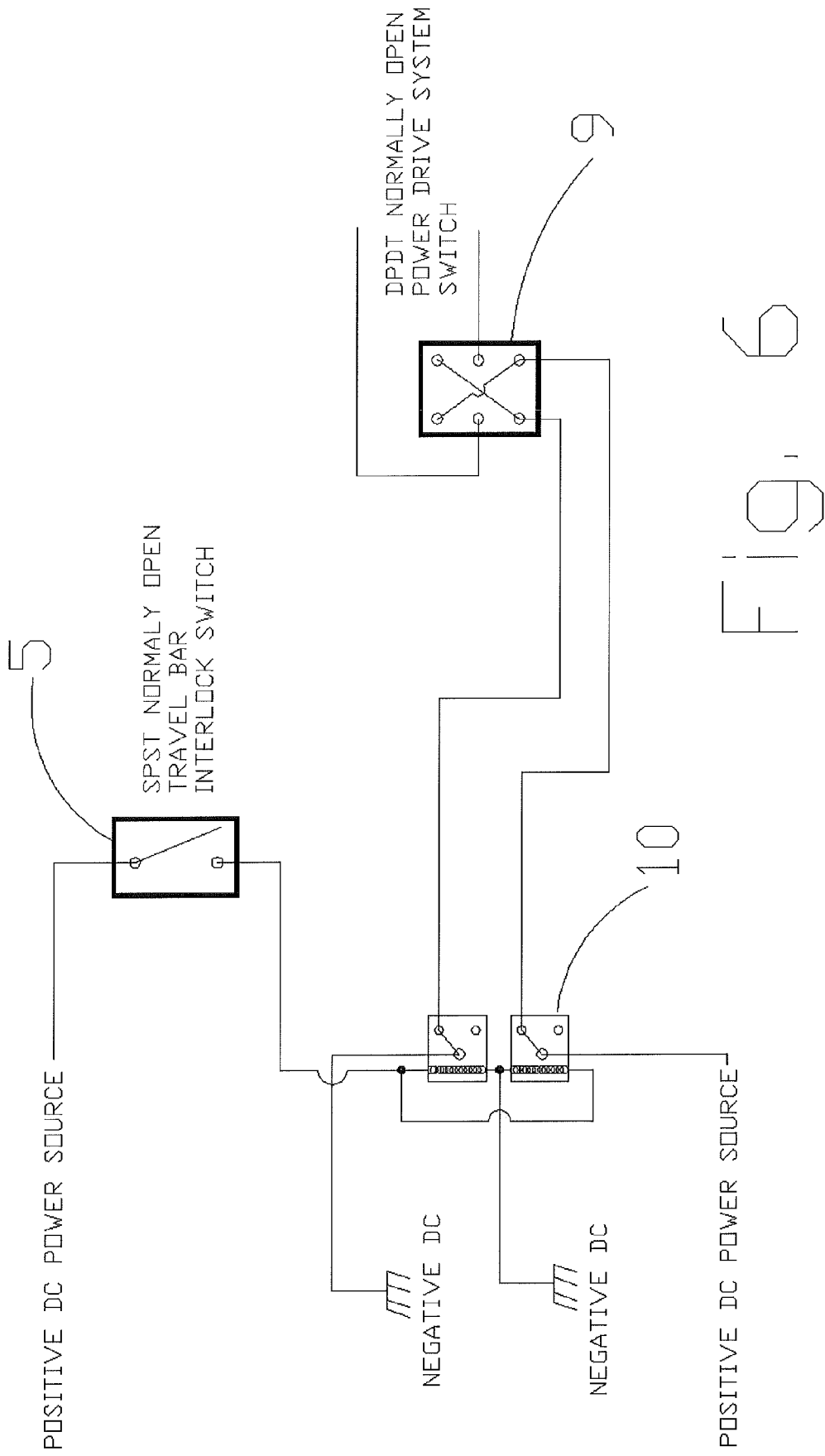
FIG. 6 is an electrical schematic for a typical slide-out room power drive system that uses a double pole double throw power drive normally open switch.

FIG. 6 is a schematic of a typical power drive electrical control circuit utilizing a double pole double throw normally open switch 9 where polarity reversal is used to determine the direction of travel of the slide-out room. The operator controls the inward and outward movement of the slide-out room with this switch. The electrical interlock switch 5 is closed when the travel bar is installed. Electrical power is then sent to the control relays 10 to disconnect power to the double pole double throw normally open switch 9 preventing movement of the slide-out room by the operator.

Figure 7:
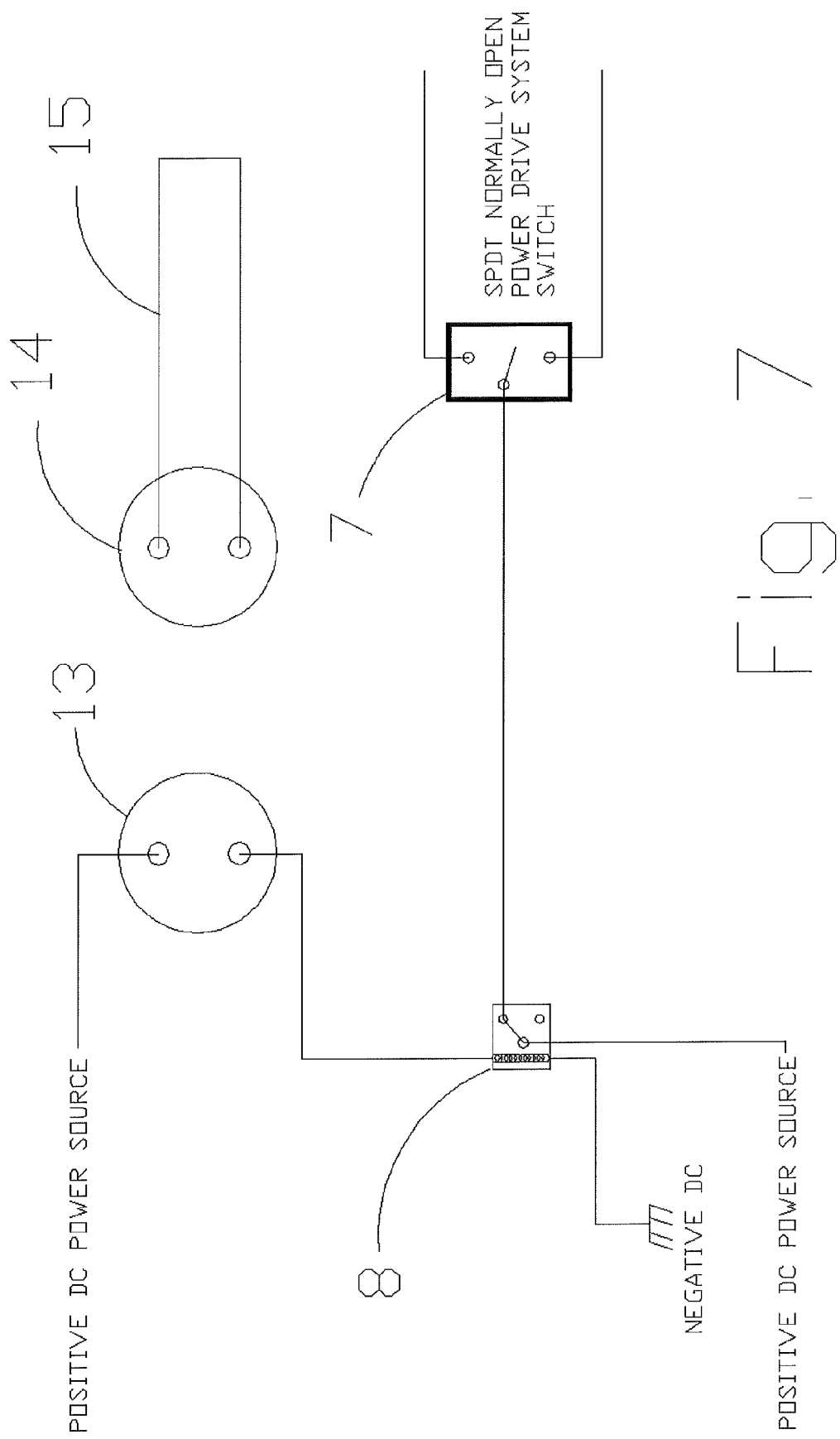
FIG. 7 is an electrical schematic of an embodiment of the travel bar lock assembly of the invention using a plug and socket assembly.

FIG. 7 is a schematic of a plug and socket as it would be used to replace the single pole single throw normally open electrical interlock switch 5 in FIGS. 5 and 6. The socket 13 receives the plug 14 where the electrical conductor 15 powers the relay 8 and closes the relay coil circuit. This removes power from the slide room control circuit. This conductor is mechanically attached to the travel bar in order to function as a single component. This configuration will operate with both circuits as shown in FIGS. 5 and 6.

Figure 8:
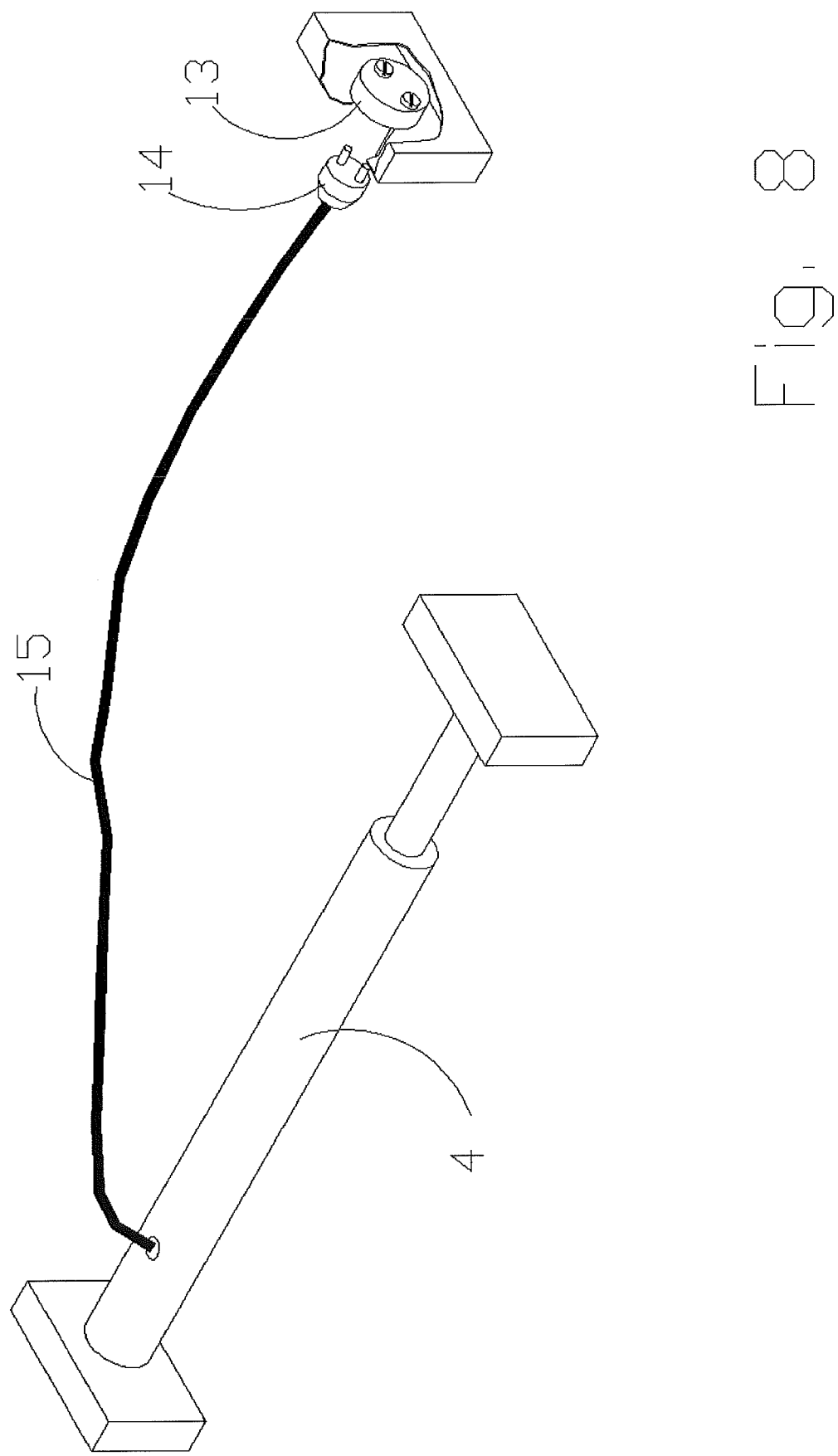
FIG. 8 is a perspective view of an embodiment of the travel bar of the invention showing the plug, cord, and socket.

FIG. 8 is an embodiment of the travel bar 4 with the conductor 15 mechanically attached as previously described in FIG. 7. The plug 14 is inserted into the socket 13 to close the circuit disabling the power drive system of the slide room. Power is restored to the drive and the slide room can be deployed upon removing plug 14 from socket 13 and travel bar(s) 4 from between the vehicle wall and the facer board of the slide-out room.

FIG. 9 is an embodiment of the travel bar 4 engaging the electrical interlock switch 5 where the electrical interlock switch 5 is in the form of a spring loaded push button type of switch. Provisions are made in the end of the travel bar 4 in order that the switch 5 will rest into a fixture 11 located in the end of the travel bar 4. The relay coil circuit is then closed and power is removed from the slide room control circuit. Power is restored to the drive and the slide room can be deployed when the travel bar(s) 4 is removed from between the vehicle wall and the facer board of the slide-out room.

FIG. 10 is a detail of the travel bar 4 engaging the electrical interlock switch 5 where the electrical interlock switch 5 is in the form of a magnetic reed type of switch. Provisions are made in the end of the travel bar 4 where a magnet 12 is installed in order to close the reeds within the switch 5. The relay coil circuit is then closed and power is removed from the slide room control circuit. Power is restored to the drive and the slide room can be deployed when the travel bar(s) 4 is removed from between the vehicle wall and the facer board of the slide-out room.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A travel bar lock assembly for a slide-out room of a recreational vehicle, the slide-out room has a power drive operated by a switch for moving the room between a traveling position, wherein the room is located essentially inside the vehicle and a deployed position, wherein the room extends outward from the vehicle, the lock assembly comprising:
    a travel bar for removably securing between a wall of the vehicle and a facer board of the slide-out room;
    a power source for powering the drive;
    circuitry electrically connecting the power source and the drive; and
    a switch means for controlling the flow of power to the drive,
    wherein the travel bar includes an actuator portion, the actuator portion of the bar actuates the switch means so that the switch means disables the flow of power to the power drive when the travel bar is secured between the vehicle wall and the facer board of the slide-out room, and allows the flow of power to the power drive when the travel bar is removed from between the vehicle wall and the facer board, wherein the switch means includes a plug and socket assembly, the actuator portion of the bar includes a cord with a plug, and the socket is electrically connected to the circuitry, wherein the circuitry is closed, the drive has no power, and the slide-out room cannot be moved when the socket receives the plug and the travel bar is secured between the vehicle wall and the facer board of the slide-out room.

2. A lock assembly according to claim 1, wherein the circuitry includes a relay electrically connected to the power drive for controlling the flow of power to the power drive.

3. A lock assembly according to claim 2, wherein the power drive switch is a double pole double throw switch having an open configuration.

4. A travel bar lock assembly for a slide-out room of a recreational vehicle the slide-out room has a power drive operated by a switch for moving the room between a traveling position, wherein the room is located essentially inside the vehicle and a deployed position, wherein the room extends outward from the vehicle, the lock assembly comprising:
    a travel bar for removably securing between a wall of the vehicle and a facer board of the slide-out room;
    a power source for powering the drive;
    circuitry electrically connecting the power source and the drive; and
    a switch means for controlling the flow of power to the drive, wherein the travel bar includes an actuator portion, the actuator portion of the bar actuates the switch means so that the switch means disables the flow of power to the power drive when the travel bar is secured between the vehicle wall and the facer board of the slide-out room, and allows the flow of power to the power drive when the travel bar is removed from between the vehicle wall and the facer board, wherein the switch means includes an interlock switch having magnetic reeds, and the actuator portion of the travel bar includes a magnet for closing the reeds on the interlock switch and closing the circuitry so the drive has no power when the travel bar is secured between the vehicle wall and the facer board of the slide-out room so that the slide-out room cannot be moved.

5. A lock assembly according to claim 4, wherein the circuitry includes a relay and a power drive switch electrically connected between the interlock switch and the power drive.

6. A lock assembly according to claim 5, wherein the power drive switch is a double pole double throw switch having an open configuration.

7. A travel bar lock assembly for a slide-out room of a recreational vehicle, the slide-out room has a power drive operated by a switch for moving the room between a traveling position, wherein the room is located essentially inside the vehicle and a deployed position, wherein the room extends outward from the vehicle, the lock assembly comprising:
    a travel bar for removably securing between a wall of the vehicle and a facer board of the slide-out room;
    a power source for powering the drive;
    circuitry electrically connecting the power source and the drive; and
    a switch means for controlling the flow of power to the drive, wherein the travel bar includes an actuator portion, the actuator portion of the bar actuates the switch means so that the switch means disables the flow of power to the power drive when the travel bar is secured between the vehicle wall and the facer board of the slide-out room, and allows the flow of power to the power drive when the travel bar is removed from between the vehicle wall and the facer board, wherein the switch means includes an interlock switch with a button, and the actuator portion of the travel bar is adapted to engage the button on the interlock switch and close the circuitry so the drive has no power when the travel bar is secured between the vehicle wall and the facer board of the slide-out room so that the slide-out room cannot be moved.

8. A lock assembly according to claim 7, wherein the circuitry includes a relay and a power drive switch electrically connected between the interlock switch and the power drive.

9. A lock assembly according to claim 8, wherein the power drive switch is a double pole double throw switch having an open configuration.

10. A method for powering off the drive of a slide-out room that moves the room between a traveling position, wherein the room is located essentially inside a vehicle and a deployed position, wherein the room extends outward from the vehicle, the slide-out room includes a locking apparatus with at least one travel bar for removably securing between a wall of the vehicle and a facer board of the slide-out room when the room is in the traveling position, the method comprising:

electrically connecting a switch means downstream from a power source that powers the drive and upstream from the drive; and providing an actuator portion on the travel bar, wherein the actuator portion actuates the switch means so that the switch means turns off the flow of power to the power drive when the travel bar is secured between the vehicle wall and the facer board of the slide-out room, and allows the flow of power to the power drive when the travel bar is removed from between the vehicle wall and the facer board of the slide-out room, wherein the switch means includes a plug and socket assembly, the actuator portion of the bar includes a cord with a plug, and the socket is electrically connected to the circuitry, wherein the circuitry is closed, the drive has no power, and the slide-out room cannot be moved when the socket receives the plug and the travel bar is secured between the vehicle wall and the facer board of the slide-out room.

11. A method according to claim 10, wherein the circuitry includes a relay electrically connected to the power drive for controlling the flow of power to the power drive.

12. A method according to claim 11, wherein the power drive switch is a double pole double throw switch having an open configuration.

13. A method for powering off the drive of a slide-out room that moves the room between a traveling position, wherein the room is located essentially inside a vehicle and a deployed position, wherein the room extends outward from the vehicle, the slide-out room includes a locking apparatus with at least one travel bar for removably securing between a wall of the vehicle and a facer board of the slide-out room when the room is in the traveling position, the method comprising:

electrically connecting a switch means downstream from a power source that powers the drive and upstream from the drive; and providing an actuator portion on the travel bar, wherein the actuator portion actuates the switch means so that the switch means turns off the flow of power to the power drive when the travel bar is secured between the vehicle wall and the facer board of the slide-out room, and allows the flow of power to the power drive when the travel bar is removed from between the vehicle wall and the facer board of the slide-out room, wherein the switch means includes an interlock switch having magnetic reeds, and the actuator portion of the travel bar includes a magnet for closing the reeds on the interlock switch and closing the circuitry so the drive has no power when the travel bar is secured between the vehicle wall and the facer board of the slide-out room so that the slide-out room cannot be moved.

14. A method according to claim 13, wherein the circuitry includes a relay electrically connected to the power drive for controlling the flow of power to the power drive.

15. A method according to claim 14, wherein the power drive switch is a double pole double throw switch having an open configuration.

16. A method for powering off the drive of a slide-out room that moves the room between a traveling position, wherein the room is located essentially inside a vehicle and a deployed position, wherein the room extends outward from the vehicle, the slide-out room includes a locking apparatus with at least one travel bar for removably securing between a wall of the vehicle and a facer board of the slide-out room when the room is in the traveling position, the method comprising:

electrically connecting a switch means downstream from a power source that powers the drive and upstream from the drive; and providing an actuator portion on the travel bar, wherein the actuator portion actuates the switch means so that the switch means turns off the flow of power to the power drive when the travel bar is secured between the vehicle wall and the facer board of the slide-out room, and allows the flow of power to the power drive when the travel bar is removed from between the vehicle wall and the facer board of the slide-out room, wherein the switch means includes an interlock switch with a button, and the actuator portion of the travel bar is adapted to engage the button on the interlock switch and close the circuitry when the travel bar is secured between the vehicle wall and the facer board of the slide-out room so that the slide-out room cannot be moved.

17. A method according to claim 16, wherein the circuitry includes a relay electrically connected to the power drive for controlling the flow of power to the power drive.

18. A method according to claim 17, wherein the power drive switch is a double pole double throw switch having an open configuration.

* * * * *